United States Patent [19]
Rendall et al.

[11] Patent Number: 5,895,523
[45] Date of Patent: Apr. 20, 1999

[54] PROCESS FOR MAKING BASIC ALKALI METAL SULFATE PIGMENTS

[75] Inventors: John S. Rendall; Massoud Ahghar; Jerry V. Fox, all of Albuquerque, N.M.

[73] Assignee: Solv-Ex Corporation, Albuquerque, N.M.

[21] Appl. No.: 08/998,410

[22] Filed: Dec. 24, 1997

[51] Int. Cl.$^6$ .................. C09C 1/40; C09D 17/00
[52] U.S. Cl. .............. 106/400; 23/302 R; 23/305 A; 106/401; 423/184; 423/199
[58] Field of Search .............. 23/302 R, 302 T, 23/305 A; 423/179, 184, 199; 106/400, 401

[56] References Cited

U.S. PATENT DOCUMENTS

| | | | |
|---|---|---|---|
| 2,895,813 | 7/1959 | Brooksbank et al. | 23/305 R |
| 4,769,080 | 9/1988 | Clark et al. | 106/402 |

FOREIGN PATENT DOCUMENTS

| | | | |
|---|---|---|---|
| 30115 | 10/1919 | Norway | 423/199 |
| 25183 | of 1909 | United Kingdom | 106/401 |

*Primary Examiner*—Gary P. Straub
*Assistant Examiner*—Timothy C. Vanoy
*Attorney, Agent, or Firm*—Thomas E. Schatzel; Law Offices of Thomas E. Schatzel, A Prof. Corporation

[57] ABSTRACT

A process is provided for making $K_2SO_4\ 3Al_2O_3 4SO_3+xH_2O$ or $Na_2SO_4\ 3Al_2O_3\ 4SO_3+xH_2O$ where x is a number from 4 to 12, which is used as a pigment. Sulfuric acid, one of a sulfate salt or a hydroxide of either potassium or sodium and one of a sulfate of aluminum or a hydroxide of aluminum are inputted into a crystallizer and reacted to form either $Al_2(SO_4)_3\ K_2SO_4+24H_2O$ or $Al_2(SO_4)_3\ Na_2SO_4+24H_2O$. A fluid flow containing either $Al_2(SO_4)_3\ K_2SO_4+24H_2O$ or $Al_2(SO_4)_3\ Na_2SO_4+24H_2O$ is drawn off from the crystallizer and transferred into a pigment reactor where it is subjected to a temperature of about 200° C. and a pressure ranging from 120 to 350 pounds per square inch so as to result in the production of either basic potassium aluminum sulfate $K_2SO_4\ 3Al_2O_3\ 4SO_3+xH_2O$ or basic sodium aluminum sulfate $Na_2SO_4\ 3Al_2O_3\ 4SO_3+xH_2O$ where x is a number from 4 to 12 which is further treated in a filtration step to obtain pigment solids and a mother liquor. A portion of the reaction mixture is bled off from the crystallizer in an amount that is inversely proportional to the purity of the materials inputted into the crystallizer and the mother liquor is recycled back to the crystallizer, so that this process is able to process and react starting materials that may be of relatively lower purity.

3 Claims, 1 Drawing Sheet

PROCESS FOR MAKING BASIC ALKALI METAL SULFATE PIGMENTS

BACKGROUND OF THE INVENTION

1. Field of the Invention

The invention relates generally to the production of ink and paper pigments and fillers and more specifically to the production of under four micron sized particles of potassium aluminum sulphate to substitute for relatively more expensive titanium dioxide.

2. Description of the Prior Art

Titanium dioxide is principally used as a pigment to provide brightness, whiteness and opacity for paints and coatings, plastics, paper, inks, fibers, food and cosmetics. Titanium dioxide is by far the most widely used white pigment in the world, only diamonds have a refractive index higher than titanium dioxide. A high refractive index translates to high opacity. Only magnesium oxide is whiter than titanium dioxide, but the refractive index of this material is much lower. So much more magnesium oxide would be needed in a paint for the same opacity. For practical purposes, titanium dioxide is preferred.

Nature does not provide titanium dioxide in a form that is directly usable, it is usually associated with iron, either as ilmenite or leuxocene ores. Titanium dioxide is also mined in one of its purest forms, as rutile beach sand. The most important deposits in the world include rutile (beach sand) and ilmenite soaps, and these ores are the principle raw materials used in the manufacture of titanium dioxide pigment.

In 1995, titanium dioxide pigment, valued at about $2.6 billion, was produced by five companies at eleven plants in nine American states. In 1995, about forty-seven percent of titanium dioxide production was used in paint, varnishes, and lacquers; about twenty-four percent was used in paper; about eighteen percent in plastics; and eleven percent went to miscellaneous uses such as catalysts, ceramics, coated fabrics and textiles, floor coverings, printing ink, roofing granules, etc.

The production of titanium dioxide pigments is a two step process. The first step is to purify the ore, and is basically a refinement step. This may be achieved by either the sulfate process, which uses sulfuric acid as a liberating agent, or the chloride process, which uses chlorine as the liberating agent. Once refined, and developed to the appropriate particle size, the pigment may be surface treated with inorganic oxides or an organic material to give each grade its unique characteristics.

The sulfate process for producing titanium dioxide pigments is often referred to as the older process, relative to the more modern chloride process. The sulfate process is used to produce high quality titanium dioxide pigment grades for the ink, fibers and paper industries. Kronos, Inc. (Houston, Tex.), for example, was granted patents for the sulfate process and has been producing titanium dioxide pigment using this process continuously since 1916. Since the late 1970's, Kronos has also manufactured grades using the chloride process. The chloride process was developed by the Kronos research and development group in Leverkusen, Germany, and commissioned its first chloride plant in the late 1970's.

A high purity rutile titanium dioxide is used in electroceramics for its dielectric properties, in vitreous enamels for its ease of fusion, in glasses to modify the refractive index and to improve the thermal and mechanical properties, in containers to absorb ultraviolet light for food preservation, in ceramics to enhance sintering and improve the thermal and chemical resistance, and in arc welding to ensure excellent ionization and easy re-ignition of the electrode to prevent electrode sputtering and control slag fluidity.

The rutile titanium dioxide grade is typically produced via the sulfate process, with low abrasion and high gloss. High brightness and very good opacity allows for this to be an ideal pigment for ink formulations, particularly rotogravure and polyamide flexo inks where it combines excellent dispersion, high gloss and opacity with very low abrasion.

Titanium dioxide pigments can be designed for ease of dispersion in many aqueous applications with minimal requirement for dispersing agents. Such pigment can be added at the beater or hydropulper to improve the opacity and brightness of the finished sheet. It can be used in the dry state as received, or can be slurried in water at the mill site to take advantage of slurry additions. It is also used to enhance opacity and brightness of paper coatings. It disperses readily in water at high solids without additional dispersing agent over that normally used in the coating mixture. The pigment can be used for white sidewall rubber goods that provide self-cleanup through chalking and resistance to ozone cracking. Its low abrasion properties promote its application in rubber thread compounds, both extruded and cut rubber thread. Cost effectiveness may be obtained in white plastic film, sheeting and profiles. Titanium dioxide pigment is used in traffic marking paints where an anatase grade is permitted. Field tests of traffic stripes indicate that the weathering of pigmented traffic stripes result in improved night visibility with minimal film loss. Titanium dioxide pigment may be used in white exterior aqueous and non-aqueous paints to impart controlled chalking.

Titanium dioxide pigment can be used in melamine laminate compositions where its resistance to ultraviolet light discoloration is outstanding. Titanium dioxide pigment can provide high brightness and very high resistance to ultraviolet discoloration in pigmented decorative papers for melamine formaldehyde laminates. KRONOS 2081 pigment is suitable for use in printing inks which are used in melamine-formaldehyde laminate systems. KRONOS 2081 pigment is suitable for pigmentation of melamine formaldehyde resins.

SUMMARY OF THE PRESENT INVENTION

It is therefore an object of the present invention to provide substitute materials for titanium dioxide pigment.

It is a further object of the present invention to provide an efficient process for making potassium aluminum sulphate.

It is a still further object of the present invention to provide an efficient process for making sodium aluminum sulfate.

It is another object of the present invention to provide an economical process for making at least one of potassium aluminum sulphate and sodium aluminum sulfate from feed materials that cannot always be of the highest purities.

Briefly, an embodiment of the present invention is a process and system for making a pigment substitute for titanium dioxide. The substitute pigment material is a basic double salt of at least one potassium aluminum sulphate and sodium aluminum sulfate, e.g., $K_2SO_4 \cdot 3Al_2O_3 \cdot 4SO_3 + 9H_2O$ and $Na_2SO_4 \cdot 3Al_2O_3 \cdot 4SO_3 + 9H_2O$. The process and system are particularly adept at producing particle sizes in two classifications, under one micron and from one to four microns. Inputs of either the sulfate salt or the hydroxide of either potassium or sodium and either the sulfate salt or the hydroxide of aluminum are accepted as feed materials. These are mixed in a crystallizer and held for a "residence time". The purity of each chemical input preferably exceeds ninety-five percent, because this results in a minimum residence time. The lower is the residence time, the higher will be the process throughput. Lower purity input chemicals can be accommodated, but these require longer residence times. A critical economic balance is struck between the cost of high purity input chemicals and the consequential residence time. The objects are to produce the lowest cost per unit of pigment substitute material, and to be able to stay in production when high purity input chemical feeds are temporarily unavailable or world materials markets drive the prices too high. A bowl type centrifuge is specially adapted to have two liquid taps, at different radial points on the bowl centrifuge, so that the pigment substitute material output can be bifurcated into two products, one with particle sizes under a micron and the other with particle sizes from one to four microns.

An advantage of the present invention is that a process is provided for producing a titanium dioxide pigment substitute.

Another advantage of the present invention is that a process is provided for producing basic potassium aluminum sulfate.

An advantage of the present invention is that a process is provided for producing basic sodium aluminum sulfate.

These and other objects and advantages of the present invention will no doubt become obvious to those of ordinary skill in the art after having read the following detailed description of the preferred embodiments that are illustrated in the drawing figure.

IN THE DRAWINGS

FIG. 1 is a diagram of a process system for producing potassium aluminum sulphate in an embodiment of the present invention.

DETAILED DESCRIPTION OF THE PREFERRED EMBODIMENT

Figure 1:
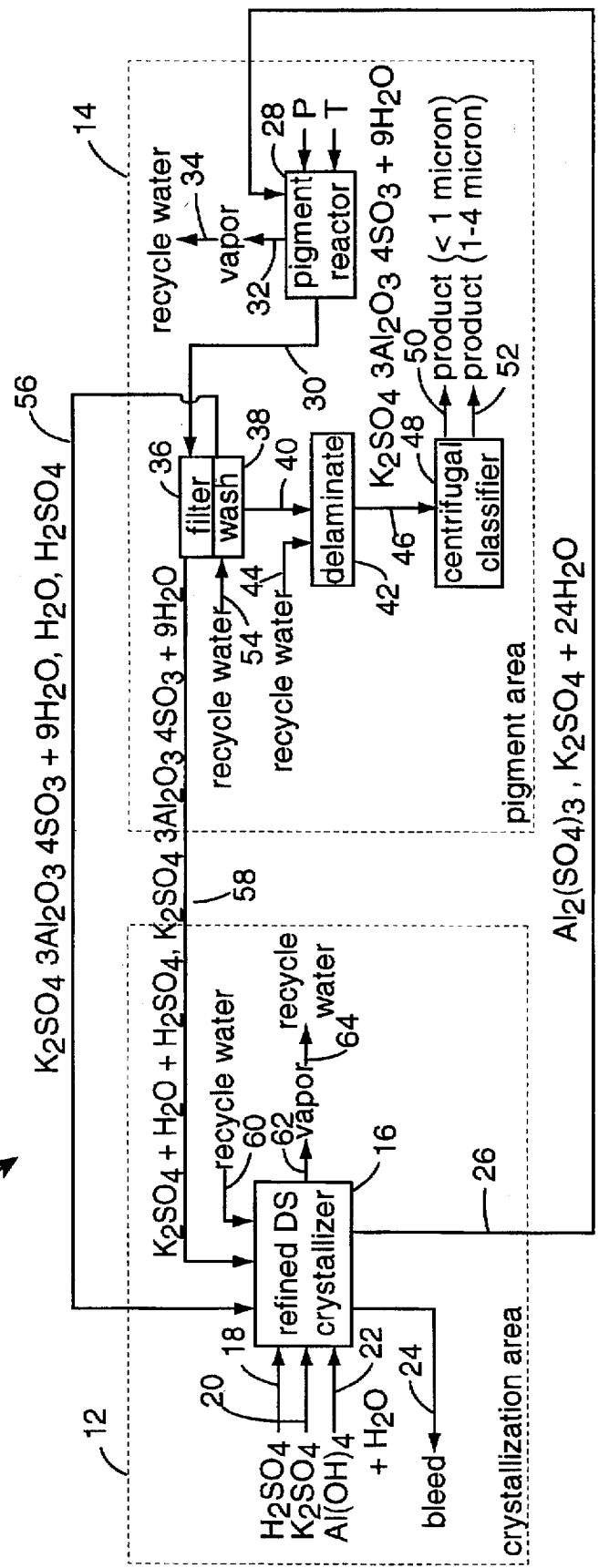

FIG. 1 illustrates a process system embodiment of the present invention, referred to herein by the general reference numeral 10. The process system 10 is useful for making a pigment substitute for titanium dioxide of a basic double salt of at least one potassium aluminum sulphate and sodium aluminum sulfate with the chemical formulas of $K_2SO_4$ $3Al_2O_3$ $4SO_3+XH_2O$ and $Na_2SO_4$ $3Al_2O_3$ $4SO_3+XH_2O$, wherein "X" is nominally nine, but can range four to twelve. The process system 10 includes a crystallization area 12 connected to a filler pigment area 14. A refined double salt (DS) crystallizer 16 is connected to receive an acid $H_2SO_4$ feed material 18, either the sulfate salt or the hydroxide of either potassium or sodium feed material 20, and either the sulfate salt or the hydroxide of alumina feed material 22. For example, a $K_2SO_4$ feed material 20, and a $Al(OH)_3$ feed material 22. A makeup water may also be added. The $H_2SO_4$ feed material 18 has a purity level that is preferably ninety-three to ninety-eight percent by weight.

The following description applies to both a potassium case and a sodium case, so herein sodium or its symbol, Na, may be substituted in these paragraphs for potassium or its symbol, K, without altering the merits of the description. Such substitution in the practice of the present invention will produce viable substitutes for titanium dioxide pigment, $TiO_2$, using the same processes and similar operating conditions.

The $K_2SO_4$ feed material 20 and $Al(OH)_3$ feed material 22 have purity levels that are preferably about ninety-five percent by weight. Such high purity levels allow for minimal residence times in the crystallizer 16 and thereby maximize process throughput. A bleed 24 is used that will increase when lower purity levels are used for the feed materials 18, 20, and 22. The crystallizer 16 produces a refined DS crystal output flow 26 that comprises $Al_2(SO_4)_3$ $K_2SO_4+YH_2O$, wherein "Y" nominally twenty-four. A pigment reactor 28 receives such output flow 26 and has both heat (T) and pressure (P) applied, e.g., 200° C. and 250 PSIG. A reactor output flow 30 comprises $K_2SO_4+H_2O+H_2SO_4$, and some $K_2SO_4$ $3Al_2O_3$ $4SO_3+9H_2O$. A water vapor output 32 that changes to a recycle water flow 34 is drawn off of the pigment reactor 28. A filter 36 receives the flow 30 and removes crystals of $K_2SO_4$ $3Al_2O_3$ $4SO_3+9H_2O$ which are passed to a washer 38 and output as a flow 40 to a delaminator 42. A recycle water 44 is added and a flow 46 results that includes particles of $K_2SO_4$ $3Al_2O_3$ $4SO_3+9H_2O$ that are under four microns.

A specially adapted and modified centrifugal classifier 48 is used to separate a first product flow 50 with particle sizes under one micron and a second product flow 52 with particle sizes between one and four microns. For example, high centrifugal bowl units made by Bird Machine Company, Robatel, or Humboldt may be adapted for use, or a modified hydrocyclone or any other particle classifying device capable of separating particles into two or more size ranges.

Two centrifugal classifier output flows are preferably tapped at different velocity points to produce the output flows 50 and 52. In the Robatel, the feed solution including one or more solutes and an immiscible solvent with a different density flow counter is passed through a series of mono-stage centrifugal extractors. The successive mixing and separation operations performed in the extractors permit the mass transfer of the solutes from the feed to the solvent. Each stage consists of a motor coupled directly to the extractor shaft, and a mixing chamber located in the bottom of the stationary casing. The turbine and the mixing chamber act as a pump to draw the liquids from the contiguous stages and to transfer the emulsion into the separation bowl. A rotating bowl separates the two liquids by centrifugal force. Overflow weirs regulate and stabilize the interface position for each phase such that it is independent of the liquid flow rates. A casing which collects the two separated liquids discharges from the bowl and transfers them to the contiguous stages.

A recycled water flow 54 is added to the washer 38 and a wash water 56 results that is returned to the crystallizer 16. A mother liquor 58 that did not filter out in the filter 36 is also returned to the crystallizer 16. A recycled water flow 60 is provided to the crystallizer 16. A water vapor output 62 that changes to a recycle water flow 64 is drawn off of the crystallizer 16.

For example, the crystallizer 16 may comprise a surface-cooled type of crystallizer with a heat-exchanger input temperature of 160° F. and a surface-chilled temperature of 60° F. The surface-cooled crystallizer 16 promotes a supersaturated concentration that causes relatively large and very pure crystals of potassium aluminum sulphate to drop out into the refined DS crystal flow 26. A temperature gradient within the leach liquor is contrived thereby to promote such crystal formation. The surface-cooled crystallizer 16 may comprise a four-foot diameter twelve-foot high stainless steel tank with a system of chilling pipes that circuit the outside surface.

While the above description includes the step of double salt crystallization, such step is useful in those circumstances where the feed materials have contaminants that would adversely impact the product quality to the point of rendering it unusable as a pigment. In those circumstances where feed materials are sufficiently pure, the step of double salt crystallization may be omitted.

Although a bowl-type centrifuge has been described, any other separating device capable of producing the required product separation by particle size is acceptable, and would not otherwise affect the merits of the embodiments of the present invention.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A process for making a pigment wherein the pigment is either basic potassium aluminum sulfate $K_2SO_4$ $3Al_2O_3$ $4SO_3+xH_2O$ or basic sodium aluminum sulfate $Na_2SO_4$ $3Al_2O_3$ $4SO_3+xH_2O$ where x is a number from 4 to 12, wherein the process comprises the steps:

inputting $H_2SO_4$ into a crystallizer;

inputting one of a sulfate or a hydroxide of either potassium or sodium into said crystallizer;

inputting one of a sulfate of aluminum or a hydroxide of aluminum into said crystallizer;

mixing the $H_2SO_4$, one of a sulfate or a hydroxide of either potassium or sodium and one of a sulfate salt of aluminum or a hydroxide of aluminum in said crystallizer;

holding the resulting mixture in said crystallizer for a time sufficient to form either $Al_2(SO_4)_3$ $K_2SO_4+24H_2O$ or $Al_2(SO_4)_3$ $Na_2SO_4+24H_2O$;

drawing off a fluid flow containing either $Al_2(SO_4)_3$ $K_2SO_4+24H_2O$ or $Al_2(SO_4)_3$ $Na_2SO_4+24H_2O$ and transferring said fluid flow into a pigment reactor where said fluid flow is subjected to a temperature of about 200° C. and a pressure selected from the range of 120 to 350 pounds per square inch so as to form the pigment, basic potassium aluminum sulfate $K_2SO_4$ $3Al_2O_3$ $4SO_3+xH_2O$ or the pigment, basic sodium aluminum sulfate $Na_2SO_4$ $3Al_2O_3$ $4SO_3+xH_2O$ where x is a number from 4 to 12;

transferring the fluid flow containing said pigment from the pigment reactor to a filtration unit, and filtering the pigment out of the fluid flow to obtain pigment solids and a mother liquor and recycling the mother liquor back to the crystallizer, wherein a portion of the mixture in the crystallizer is drawn out of the process in an amount that is inversely proportional to the purity of the materials inputted into said-crystallizer.

2. The process of claim 1, further comprising the steps of:

washing the pigments solids;

delaminating the washed pigment solids, and centrifugally separating the output from the delaminating step so as to obtain pigment particles in two batches of different particle diameter sizes, one batch containing pigment particles having a size diameter of less than one micron and the other batch containing pigment particles having a size diameter in the range of one to four microns.

3. The process of claim 1, wherein the purity levels of the $H_2SO_4$, one of a sulfate or a hydroxide of either potassium or sodium and one of a sulfate of aluminum or a hydroxide of aluminum exceeds ninety five percent by weight.

* * * * *